United States Patent [19]
Asaka et al.

[11] Patent Number: 4,467,751
[45] Date of Patent: Aug. 28, 1984

[54] SEALING STRUCTURE OF A ROTARY VALVE IN AN INTERNAL COMBUSTION ENGINE

[75] Inventors: Urataro Asaka; Noboru Kurata, both of Kami-fukuoka; Masanori Masumura, Sayama, all of Japan

[73] Assignee: Honda Giken Kogyo Kabushiki Kaisha, Tokyo, Japan

[21] Appl. No.: 328,390

[22] Filed: Dec. 7, 1981

Related U.S. Application Data

[63] Continuation of Ser. No. 050,321, Jun. 20, 1979, abandoned.

[30] Foreign Application Priority Data

Jun. 22, 1978 [JP] Japan ............................. 53-85553

[51] Int. Cl.³ .............................................. F01L 7/16
[52] U.S. Cl. ............................................. 123/190 E
[58] Field of Search ................................... 123/190 E

[56] References Cited

U.S. PATENT DOCUMENTS

| | | | |
|---|---|---|---|
| 1,363,894 | 12/1920 | Molstad | 123/190 E |
| 1,671,254 | 5/1928 | Porter | 123/190 E |
| 2,017,196 | 10/1935 | Anglada et al. | 123/190 E |
| 2,330,583 | 9/1943 | Heylandt et al. | 123/190 E |
| 3,871,340 | 3/1975 | Zimmerman | 123/190 E |

FOREIGN PATENT DOCUMENTS 0573920 7/1924 France ............................ 123/190 E

*Primary Examiner*—Craig R. Feinberg
*Assistant Examiner*—W. R. Wolfe
*Attorney, Agent, or Firm*—Irving M. Weiner; Pamela S. Burt; Anthony L. Cupoli

[57] ABSTRACT

A sealing structure of a rotary valve in an internal combustion engine in which a recess is formed either at an opening portion of a rotary valve proper or at an opening portion of a combustion chamber in a housing and in which a seal member slidably fitted in the recess is resiliently pushed against the opposing part by means of a spring member. An annular resilient member is interposed between the lower surface of the seal member and the opposing bottom surface of the recess in such a manner that the two ends of the resilient member are respectively in contact with the surfaces of the seal member and the recess. Thereby, the contact pressure at the ends of the resilient member is increased by utilizing the gas pressure in the combustion chamber. Further, the pushing force of the seal member against the opposing part is increased, so as to enhance sealing efficiency.

4 Claims, 15 Drawing Figures

SEALING STRUCTURE OF A ROTARY VALVE IN AN INTERNAL COMBUSTION ENGINE

This is a continuation of application Ser. No. 50,321 filed June 20, 1979, now abandoned.

BACKGROUND OF THE INVENTION

1. Field of the Invention

The present invention relates to an improvement of a sealing structure of a rotary valve in an internal combustion engine. Particularly, the invention includes a recess provided either at the opening portion of a rotary valve proper or at the opening portion of a combustion chamber defined in a housing of a rotary valve proper, and a seal member slidably fitted in the recess and elastically pushed against the opposing part so as to effect sealing.

2. Description of Relevant Art

There has been known a rotary valve which opens and closes between the intake and exhaust passages and the combustion chamber of an internal combustion engine. The valve opens and closes by means of a rotator and replaces a valve of a mushroom-shape for use as intake and exhaust valves in an internal combustion engine.

In an internal combustion engine of such rotary valve type, various problems are caused due to high speed rotation of the valve. Such problems generally relate to the sealing between the intake and exhaust ports of the valve and the opening portion of the combustion chamber, which are opposite to each other in the respective intake and exhaust strokes.

An example of a rotary valve and its sealing structure is shown in FIG. 15. Above a piston 3 within a cylinder 2 of an internal combustion engine 1 is provided a rotor housing 4 as a cylinder head so as to form a combustion chamber therein. In the rotor housing 4 is formed a cylindrical rotor housing chamber 6 extended in a direction perpendicular to the axial direction of cylinder 2. A rotary valve proper 7 is provided in chamber 6. The rotary valve proper 7, which is of a cylindrical shape, has a hollow space 7a which communicates with an inlet passage 8a of an inlet manifold 8 so as to form a portion thereof. The rotary valve proper 7 also has an exhaust passage 7b which communicates with a passage 9a of an exhaust manifold 9 and is arranged so as to be separated and sectioned from the space 7a and extended therethrough. Ports 7c and 7d which open at the ends of passages 7a and 7b, are arranged so as to be angularly shifted from each other on the same plane in the radial direction of the rotary valve proper 7 and to selectively communicate with combustion chamber 5 therethrough. The rotary valve proper 7 is rotatively driven by a crankshaft arrangement via a sprocket 7e and a chain 7f and the like.

The sealing for the rotary valve is made by forming a circular recess 10 at the upper end of combustion chamber 5 and fitting a seal member 11 formed of ceramics, carbon or the like in circular recess 10. The sealing member 11, which is ring-shaped, is provided with a central opening having a diameter which corresponds to the inner diameter at the upper end of combustion chamber 5 and ports 7c, 7d. The sealing structure including seal member 11 is shown in FIGS. 13 and 14. A waved-spring washer 12 is interposed between the lower surface of seal member 11 and the bottom surface of recess 10 and a seal ring 13 is interposed in a ring-shaped groove 11b provided on the outer periphery of seal member 11, so as to seal between the outer periphery of seal member 11 and the inner periphery of recess 10.

In this arrangement, the seal member 11 is pushed by means of spring 12 towards the periphery of ports 7c and 7d of valve proper 7 to seal such portions. In the combustion stroke of the engine, the high pressure gas in the combustion chamber 5 exerts its pressure force upon seal member 11, and thereby seal member 11 is strongly pushed against the outer periphery of valve proper 7. At this instant, the gas passes through the gap of the spring 12, as indicated by the arrows in FIG. 14, and enters the space between the inner wall of recess 10 and the outer wall of seal member 11. Thus, seal ring 13 is pushed against the inner peripheral wall of recess 10 by means of the gas pressure, so as to prevent the leakage of gas. However, because seal ring 13, which effects the sealing between the inner wall of recess 10 and the outer peripheral wall of seal member 11, is formed in a disconnected circle as a result of mounting of seal ring 13 in ring-shaped groove 11b, a separation is necessarily formed at the juncture between the disconnected ends of seal ring 13. Thus, gas leaks from such separation and it thus becomes impossible to achieve effective sealing. In addition, the number of components increases due to the use of seal ring 13, and the structure for the sealing member becomes complex, for example, due to the fact that seal member 11 must be provided with the ring-shaped groove 11b.

The present invention effectively solves the above-described problems attendant the sealing structure of a conventional rotary valve.

SUMMARY OF THE INVENTION

The present invention provides a sealing structure of a rotary valve in an internal combustion engine in which a recess is formed either at an opening portion of a rotary valve proper or at an opening portion of a combustion chamber defined in a housing. A seal member is slidably fitted in the recess and is resiliently pushed against the opposing part by means of a resilient member. The resilient member is interposed between the lower surface of the seal member and the opposite bottom surface of the recess in such a manner that the resilient member is in contact at one point with the lower surface of the seal member and at another point with the bottom surface of the recess.

In accordance with the invention, it is sufficient that only two points of the resilient member be in contact with the lower surface of the sealing member and the bottom surface of the recess, respectively, and thus various kinds of resilient members may be employed.

According to the invention, an effective sealing structure is obtained in which the contacting pressure against the sealing member exerted at two points of the resilient member is increased by means of the gas pressure in the combustion chamber so that the pushing force of the sealing member against the rotary valve surface to be engaged is increased. Thus, the gas pressure is airtightly sealed and is prevented from leaking at the two contacting points of the resilient member.

Another object of the present invention is to provide a sealing structure in which the gas sealing and prevention of gas leakage is ensured by the pressure of combustion gas so as to enhance the air-tightness. Thus, the seal ring conventionally interposed between the inner wall of the recess and the outer periphery of the sealing member, as well as the groove to mount such seal ring, becomes unnecessary. Thereby, the number of component parts is minimized, and the sealing structure is simplified, with the seal member being formed easily.

Further objects and advantages of the present invention will become apparent from the following detailed description of the invention, with reference being had to the accompanying drawings.

DETAILED DESCRIPTION OF PREFERRED EMBODIMENTS

Figure 15:
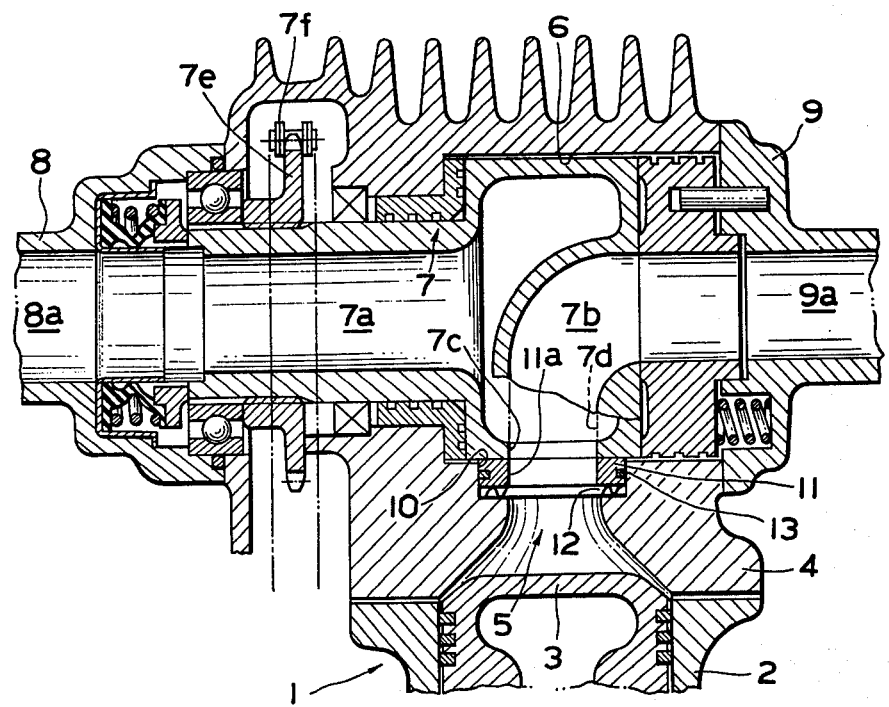
FIG. 15 is a vertical cross-sectional side view of the rotary valve as a whole provided with the structure of FIG. 13.

In the embodiments of the invention shown in FIGS. 1 thru 5, the sealing member is provided at the housing side and the structure of the rotary valve is the same as that already explained with reference to FIG. 15, and thus any further explanation thereof is eliminated hereinbelow.

Figure 1:
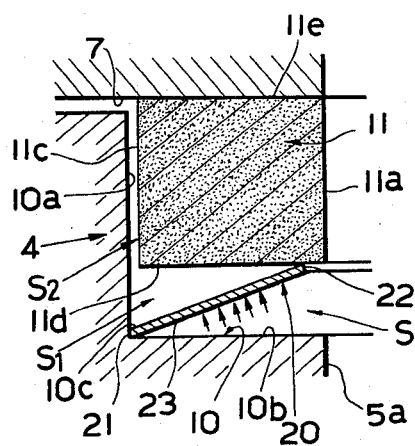
FIG. 1 is an enlarged vertical cross-sectional view of the essential parts of a first embodiment of the present invention.

In FIG. 1, which shows a first embodiment of the present invention, a circular recess 10 is provided in the housing 4 at an opening 5a of the combustion chamber, the outer diameter of recess 10 being larger than that of opening 5a. In the recess 10 is fitted a ring-shaped seal member 11 made of ceramics, carbon or the like. The outer diameter portion 11c of seal member 11 is formed to be slightly smaller than the inner diameter 10a of recess 10. Seal member 11 is provided with a central opening 11a which corresponds to the upper opening 5a of combustion chamber 5.

Between an annular bottom surface 10b of circular recess 10 and the lower surface 11d of seal member 11 is compressively interposed an annular dished spring 20. The spring 20, having a diameter at the upper end thereof which is smaller than that at the lower end thereof so as to widen towards the lower end, is formed so as to be ring-shaped. When spring 20 is compressively interposed between surfaces 10b and 11d, the outer end 21 of spring 20 resiliently abuts against the corner 10c where the inner peripheral wall 10a and the bottom 10b of recess 10 intersect. The inner diameter end 22 of spring 20 resiliently engages the lower surface 11d of seal member 11 in the vicinity of opening 11a. The seal member 11 is resiliently pushed upwardly by the spring function of spring 20. Thereby, the upper surface 11e of seal member 11 forcibly engages the outer periphery of the rotary valve proper 7 so as to effect the sealing function. The dished-spring 20 also diagonally defines an inward space (s) and an outward space (S$_1$) between the surfaces 10b and 11d, with the outer space (S$_1$) communicating with a gap (S$_2$) between the inner periphery 10a of recess 10 and the outer periphery 11c of seal member 11.

In the above arrangement, the high pressure gas at the moment of combustion tends to exert its force upon the space (S) of recess 10 as the opening 11a of seal member 11 is blocked by the valve proper 7. However, the gas is prevented from leaking to the outward space (S$_1$) because the gas pressure exerts its force upon the slant back surface 23 of dished spring 20 and pushes the same as indicated by the arrows. Accordingly, the pressure to be applied on spring end portion 21 which is in contact with the corner 10c of recess 10, and on spring end portion 22 which is in contact with the lower surface 11d, increases. At the same time, the force to resiliently push seal member 11 to the valve proper 7 increases. Thus, the dished spring 20 effects the sealing and enhances air-tightness between the outward space (S$_1$) and the inward space (S) by means of the gas pressure so as to prevent the gas from leaking through the gap (S$_2$). Consequently, it becomes unnecesssary to interpose an auxiliary conventional seal ring between the inner periphery 10a of recess 10 and the outer periphery 11c of seal member 11.

Figure 2:
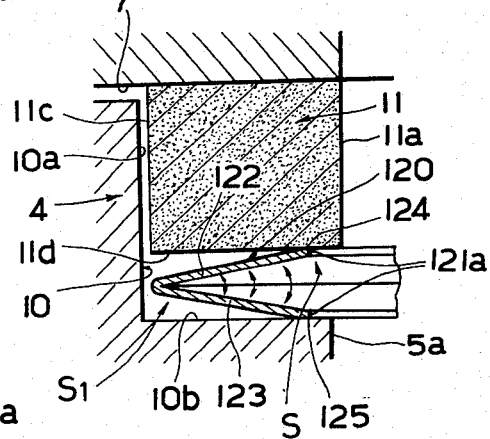
FIG. 2 is a view of a second embodiment of the present invention, similar to FIG. 1.

In the second embodiment of the present invention shown in FIG. 2, an annular seal spring 120 of a laid-down V-shape cross-section is interposed between the lower surface 11d of seal member 11 and the bottom surface 10b of recess 10. The spring 120 is formed of a pair of dished springs, such as spring 20 of the first embodiment, oppositely arranged with their outer edges integrally united. A space (S) defined at the inner side by upper and lower members 122 and 123 of spring 120 is formed in seal spring 120 so as to open inwardly, i.e., toward the combustion chamber side. The upper and lower edges 124, 125 at the opening 121a of spring 120 resiliently engage the lower surface 11d becomes of seal member 11 and the bottom of recess 10, respectively, outside the openings 11a and 5a. Thus, the inward space (S) and an outward space (S$_1$) are separated by spring 120.

The burnt gas enters the inward space (S) of spring 120 and exerts its force upon the inner surfaces of the upper and lower members 122, 123 as indicated by the arrows, so as to expand same. As a result, the pressure at the edges 124, 125 which respectively engage the surfaces 11d, 10b increases, so that the edges are in strongly-pressed contact with the surfaces 11d, 10b and seal member 11 is strongly pushed against the outer periphery of the valve proper 7, while enhancing the air-tightness between the inward and outward space portions (S) and (S$_1$).

Figure 3:
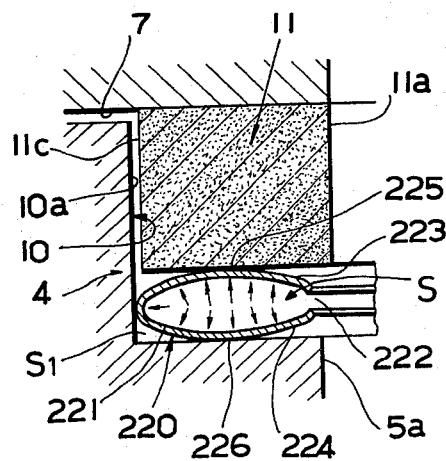
FIG. 3 is a view of a third embodiment of the present invention, similar to FIG. 1.

FIG. 3 shows a third embodiment of the present invention. An annular seal spring 220 has an elliptic cross-section. Between the inner end edges of the spring proper 221 is provided a slit 222. A space (S) in the seal spring proper 221 communicates with the combustion chamber. Ridges 225, 226 of members 223, 224 of spring 220, which are symmetrically curved upwardly and downwardly respectively, engage the central portions in the radial direction of the lower surface 11d of seal member 11 and the bottom surface of recess 10. Accordingly, an outward space (S₁) and the inward space (S) are separated from each other with seal spring 220 as a partition.

In the FIG. 3 structure, the gas exerts its force in the space (S) in spring 220 from slit 222, and pushes spring 220 as indicated by the arrows. Thereby, the pressure at the contact portions, i.e., ridges 225, 226 increases and seal member 11 is pushed against the outer periphery of the rotary valve proper 7 while increasing the air-tightness between the space (S), which communicates with the combustion chamber, and the outward space (S₁).

Figure 4:
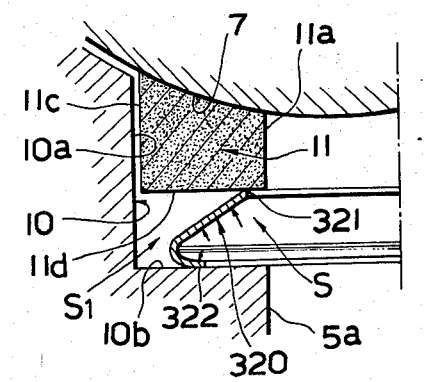
FIG. 4 is a view of a fourth embodiment of the present invention, similar to FIG. 1.
Figure 5:
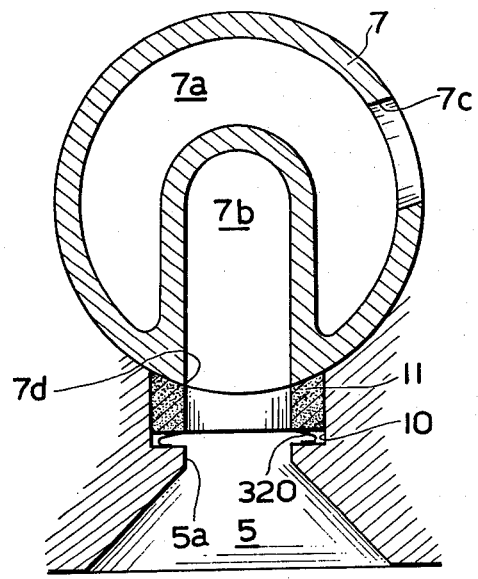
FIG. 5 is an explanatory vertical cross-sectional view of the present invention as a whole.

In a fourth embodiment of the invention shown in FIGS. 4 and 5, an annular seal spring 320 has a substantially L-shaped cross-section, with the angular portion thereof curved. An upper edge 321 of the inner end of spring 320 is in resilient contact with the lower surface 11d of seal member 11 in the vicinity of the opening 11a, and at the same time, lower end 322 of spring 320 is in resilient contact with the bottom surface 10b of recess 10.

In this arrangement (FIGS. 4 and 5), an inward space (S), which communicates with the interior of combustion chamber 5, and an outward space (S₁), are separated from each other by spring 320 and sealed at the resilient contact portions 321, 322. Spring 320 is pressed so as to expand by the function of gas pressure as indicated by the arrows. Thus, the pressure at the resilient contact portions 321, 322 increases and seal member 11 is pressed against the outer periphery of the rotary valve proper 7 while enhancing the air-tightness between the inward and outward spaces (S) and (S₁).

Figure 6:
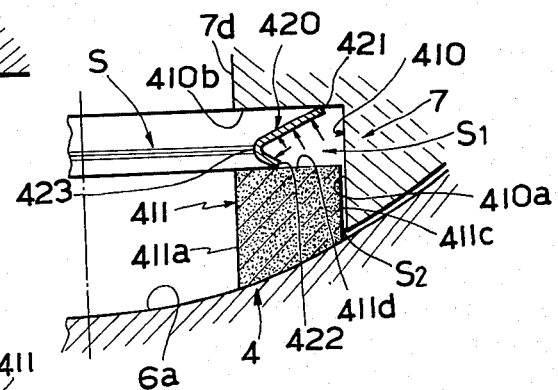
FIG. 6 is a view of a fifth embodiment of the present invention, similar to FIG. 1.
Figure 7:
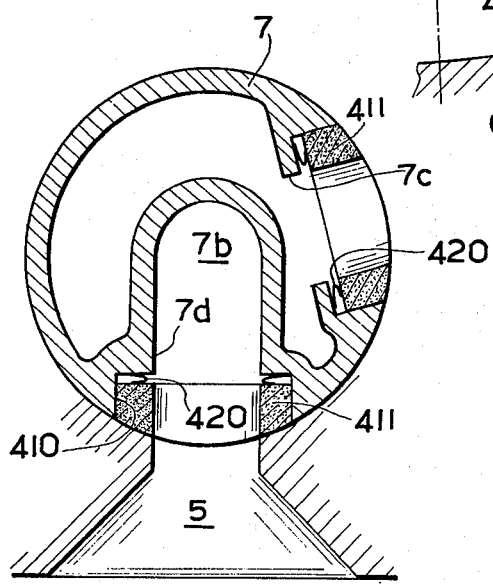
FIG. 7 is a view of the fifth embodiment of the present invention, similar to FIG. 5.

In a fifth embodiment of the invention shown in FIGS. 6 and 7, the seal member 11 is provided at the side of the rotary valve proper 7. A circular recess 410 is provided by way of example at the inlet port 7d of exhaust passage portion 7b of valve proper 7 and an annular seal member 411 is fitted in recess 410. Between the top surface of a seal member 411 and the bottom surface 410b of recess 410 is interposed an annular seal spring 420 having substantially an L-shaped cross-section. An upper end edge 421 of spring 420 is in resilient contact with the bottom surface 410b of recess 410 and the lower end edge 422 of spring 420 is in resilient contact with the top surface 411d of seal member 411. A bent corner 423 of spring 420 is directed toward the openings 411a and 7a which communicate with the combustion chamber.

In the arrangement of FIGS. 6 and 7, even if the gas under pressure in combustion chamber 5 enters an outward space (S₁) through a gap (S₂) between the outer periphery 411c of seal member 411 and the inner periphery 410a of recess 410 during rotation of valve proper 7, the gas pressure exerts its force so as to expand the spring 420 as indicated by the arrows. As a result, the pressure at the upper and lower end edges 421, 422 of spring 420 increases and the air-tightness between the inward and outward spaces (S), (S₁) is enhanced by means of spring 420. Thus, seal member 411 is strongly pressed in contact with the inner wall 6a of housing 4. Likewise, seal member 411 is also fitted in the other opening portion 7c of rotary valve 7.

Figure 8:
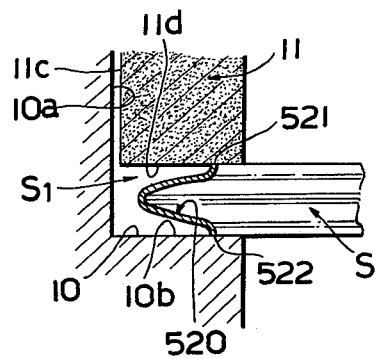
FIG. 8 is a view of a sixth embodiment of the present invention, similar to FIG. 1.

In a sixth embodiment of the invention shown in FIG. 8, the seal member 11 is fitted in the circular recess 10 of the housing 4 in the same manner as in the above-described first through fourth embodiments. An annular seal spring 520, which is formed of one complete piece, has substantially a laid-down V-shaped cross-section, opening at the inner diameter portion of seal spring 520. Upper and lower spring ends 521 and 522 of the inner diameter portion are curved so as to be directed upwardly and downwardly. The ends 521, 522 thus directed upwardly and downwardly have the end surfaces thereof respectively in free resilient contact with the bottom surface 10b of recess 10 and the lower surface 11d of seal member 11, so that an inward space (S) at the side of the combustion chamber and an outward space (S₁) are separated from each other. The spring 520 is expanded outwardly and the pressure at the resilient contact portions 521, 522 increases due to the gas pressure, so as to enhance the air-tightness between the inward and outward spaces (S), (S₁).

Figure 9:
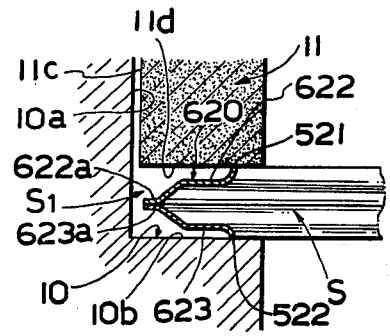
FIG. 9 is a view of a seventh embodiment of the present invention.

In a seventh embodiment of the invention shown in FIG. 9, an annular spring 620 has substantially a laid-down V-shaped cross-section, as a whole similar to the above-described sixth embodiment of the invention. However, the spring 620 is formed of two separate half pieces in this embodiment, contrary to spring 520 formed integrally of a single material in the sixth embodiment. Two dished springs 622, 623 each having substantially a compressed L-shaped cross section are provided with flange portions 622a, 623a at their outer end portions which are connected so as to oppose each other and to thus form one complete piece. Thereby, the spring 620 of substantially a laid-down V-shaped cross-section is obtained.

With the embodiment of FIG. 9, the cost for the seal spring is lowered, and the precision at the upper and lower surfaces is enhanced. Further, the height may be easily adjusted. Thus, the setting load thereon and the frictional force are decreased. The sealing effect provided by the FIG. 9 embodiment is equivalent to that of the embodiment shown in FIG. 8.

Figure 10:
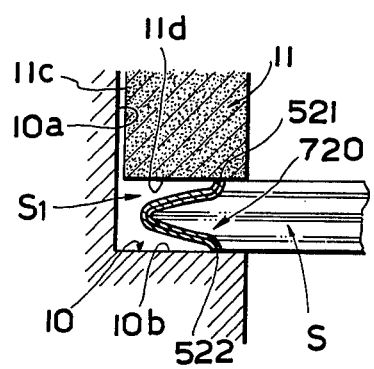
FIGS. 10 and 11, respectively, are views of modified embodiments of FIGS. 8 and 9.
Figure 11:
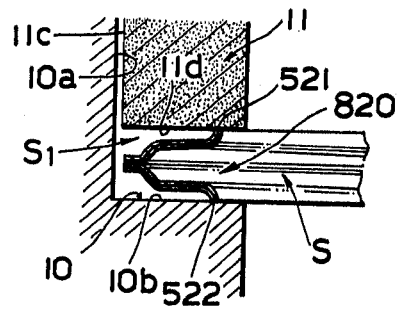

FIGS. 10 and 11 show double-bellows type embodiments of the invention which comprise, respectively, further modified embodiments of those shown in FIGS. 8 and 9. With the structure of these embodiments, the strength of springs 720, 820 can be increased as a whole.

Figure 12:
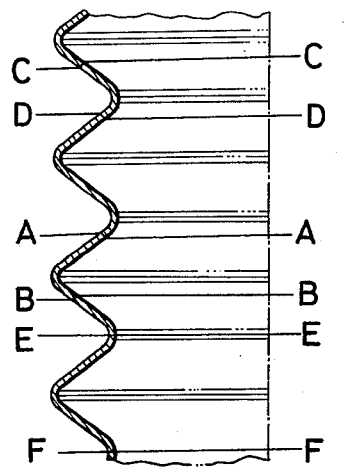
FIG. 12 is a vertical cross-sectional view of the material which forms the elastic member in accordance with the invention.
Figure 13:
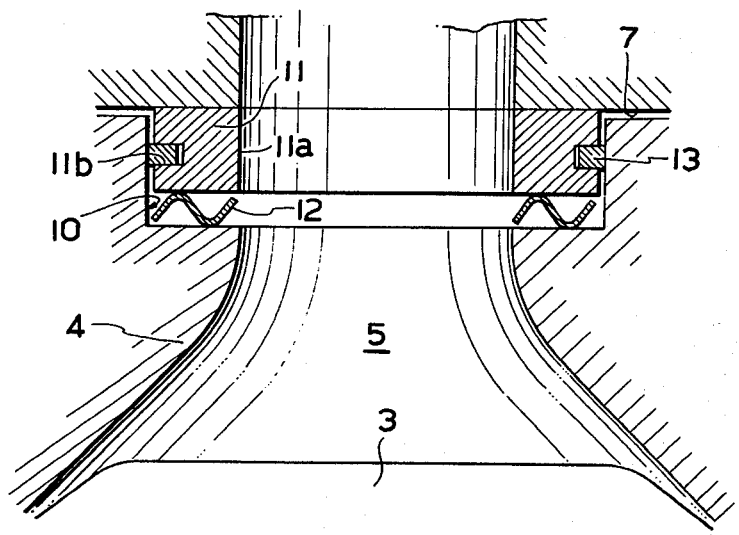
FIG. 13 is a view showing a conventional sealing structure.
Figure 14:
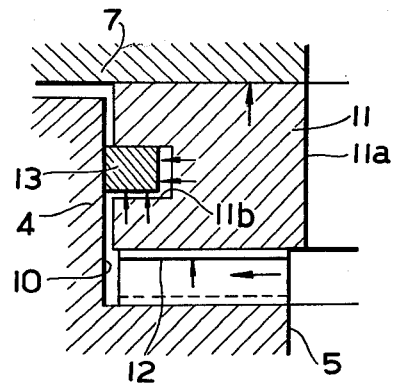
FIG. 14 is an enlarged side cross-sectional view of the structure of FIG. 13.

The spring which is used in each embodiment shown in FIGS. 4, 6 and 8 of the above-described embodiments of the invention is obtained from a tubular material 30 which is formed of a spring steel or the like as shown in FIG. 12 so as to present a cornice-shape. If the tubular material 30 is cut along the line A—A and the line B—B perpendicular to the axial direction of material 30, the spring 320 shown in FIG. 4 can be obtained. If the tubular material 30 is cut along the line C—C and the line D—D, the spring 420 shown in FIG. 6 is obtained. If the tubular material 30 is cut along the line E—E and the line F—F, the spring 520 as shown in FIG. 8 is obtained.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. In a sealing structure of a rotary valve in an internal combustion engine in which a recess is formed adjacent an opening portion of a rotary valve proper at an opening portion of a combustion chamber defined in a housing; an annular seal member slidably fitted in said recess is resiliently pushed against an opposing part of said rotary valve proper by means of a resilient means; said resilient means comprises an annular spring interposed between a lower surface of said seal member and an opposite bottom surface of said recess such that said annular spring is in contact at one point with said lower surface of said seal member and at another point with said bottom surface of said recess; and an inward space at the side of a combustion chamber opening and an outward space at the side of an inner wall of said recess being separated from each other by said annular spring, which is formed of one complete piece;

the improvement wherein:

said annular spring has substantially a laid-down V-shaped cross-section opened to high pressure gas at the inner diameter side thereof;

said spring having upper and lower ends at only the inner diameter side of said spring which are respectively in free contact with said lower surface of said seal member and said opposite bottom surface of said recess; and said upper and lower ends of said laid-down V-shape of the cross-section of said annular spring are directed and extend respectively upwardly and downwardly therefrom, said upper and lower ends having end surfaces which are in free contact with said lower surface of said seal member and said opposite bottom surface of said recess, respectively, such that leakage of high pressure gas from inside said annular spring is prevented at said free contact end surface of said ends of said annular spring.

2. A sealing structure according to claim 1, wherein:

said annular spring is formed of two separate half pieces, each having substantially a compressed L-shaped cross-section, said two half pieces being connected together to define said one complete piece.

3. A sealing structure according to claim 2, wherein:

said two separate half pieces are each provided with a flange portion at an outer end portion thereof; and said outer end portions of said separate half pieces are connected together in opposing relation to each other.

4. A sealing structure according to claim 1 or 2, wherein:

two of said annular springs ar provided so as to define a double-bellows type annular spring.

* * * * *